United States Patent
Yoshii et al.

(10) Patent No.: US 7,360,901 B2
(45) Date of Patent: Apr. 22, 2008

(54) CROSS DICHROIC MIRROR, ILLUMINATING DEVICE, AND PROJECTION TYPE VIDEO DISPLAY

(75) Inventors: Shouichi Yoshii, Osaka (JP); Yoshihiro Yokote, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 238 days.

(21) Appl. No.: 11/086,314

(22) Filed: Mar. 23, 2005

(65) Prior Publication Data

US 2005/0219468 A1    Oct. 6, 2005

(30) Foreign Application Priority Data

Mar. 30, 2004  (JP)  ............................. 2004-101329
Feb. 25, 2005  (JP)  ............................. 2005-051041

(51) Int. Cl.
G03B 21/14   (2006.01)
G03B 21/28   (2006.01)

(52) U.S. Cl. ............................. 353/20; 353/31; 353/99
(58) Field of Classification Search .................. 353/20, 353/30–31, 98, 99
See application file for complete search history.

(56) References Cited

U.S. PATENT DOCUMENTS 5,073,013 A * 12/1991 Sonehara et al. .............. 349/8
5,153,752 A * 10/1992 Kurematsu et al. ............ 349/9
5,546,206 A *  8/1996 Nakanishi et al. .......... 349/110
5,864,374 A *  1/1999 Ito et al. ..................... 348/757
6,067,128 A *  5/2000 Imai ............................ 349/8
6,183,091 B1* 2/2001 Johnson et al. .............. 353/20

FOREIGN PATENT DOCUMENTS

JP           8-334736       12/1996
JP        2002-189263        7/2002

OTHER PUBLICATIONS

Chinese Office Action issued in Chinese Patent Application No. CN 2005100629071, dated Aug. 17, 2007.

* cited by examiner

Primary Examiner—Christopher Mahoney
(74) Attorney, Agent, or Firm—McDermott Will & Emery LLP

(57) ABSTRACT

A projection type video display is provided with three LED light sources. A first LED light source emits a light in red, a second LED light source emits a light in green, and a third LED light source emits a light in blue. Lights in respective colors emitted from each LED light source are guided into a light incidence surface of a rod integrator by a cross dichroic mirror. The cross dichroic mirror is formed of a first cross dichroic mirror portion and a second dichroic mirror portion. The first cross dichroic mirror portion is divided into two portions, and the second cross dichroic mirror portion, too, is divided into two portions. The cross dichroic mirror has structure of a cross arrangement in which these four divided portions bring respective corner sides into close contact.

21 Claims, 4 Drawing Sheets

CROSS DICHROIC MIRROR, ILLUMINATING DEVICE, AND PROJECTION TYPE VIDEO DISPLAY

BACKGROUND OF THE INVENTION

Field of the Invention

The present invention relates to a cross dichroic mirror, an illuminating device, and a projection type video display. Generally, an illuminating device used for a liquid crystal projector is formed of a lamp such as an ultra-high pressure mercury lamp, a metal halide lamp, a xenon lamp, and etc., and a parabolic reflector that renders the irradiating light a parallel light. In addition, in such the illuminating device, in order to reduce a non-uniformity of a light amount from an irradiating surface, there is an integrating function of a pair of fly's eye lenses (referred to as a function for superimposing and converging on an object to be illuminated plural illuminating areas in a predetermined shape formed by an optical device in a sampling manner within a plane surface). Furthermore, in recent years, it is attempted to use a light-emitting diode (LED) as the light source (JP-A-2002-189263).

SUMMARY OF THE INVENTION

In a projection type video display, a reduction in size and weight is one of the problems. In addition, a conventional cross dichroic mirror is a mirror formed of a first dichroic mirror, and a second dichroic mirror divided into two portions, and has these three dichroic mirrors in a cross arrangement. In some cases, a bordering line (a dark line, a vertical streak) is too visible in the cross arrangement portion.

In view of the above-described circumstance, it is an object of the present invention to provide a dichroic mirror easy to reduce in size and weight and capable of reducing an occurrence of a vertical streak in a projected video, an illuminating device using the cross dichroic mirror, and a projection type video display using the illuminating device, and others.

In order to solve the above-described problem, a cross dichroic mirror of the present invention has structure formed of a first dichroic mirror divided into two portions and a second dichroic mirror divided into two portions, and formed of a cross arrangement in which these four dichroic mirrors bring respective corner sides into close contact.

The above-described configuration allows the cross dichroic mirror to have structure of a cross arrangement in which the dichroic mirror divided into four pieces brings the respective corner sides to close contact so that it is possible to reduce an occurrence of a bordering line (a dark line, a vertical streak).

In the cross dichroic mirror structured as above, a cross point may exist in a non-center portion of the first dichroic mirror and the second dichroic mirror. Furthermore, in the cross dichroic mirror structured as such, the first dichroic mirror and the second dichroic mirror may be in the cross arrangement at a right angle, or the first dichroic mirror and the second dichroic mirror may be in the cross arrangement at a non-right angle.

In addition, the illuminating device of the present invention comprises the cross dichroic mirror according to any one of claims 1 to 4 as an optical member having first and second light incidence areas to be faced to each other, one light exit area, and a third light incidence area facing the light exit area, guiding each light in respective colors incident from each light incidence area into the approximate same direction, and emitting from the light exit area, and comprises a light source in red arranged in the first light incidence area, a light source in blue arranged in the second light incidence area, and a light in green incidence arranged in the third light incidence area.

In the illuminating device structured as above may comprise a light integrator that renders uniform on an object to be illuminated an intensity of each light in respective colors emitted from the dichroic mirror. The light integrator may be a rod integrator structured of being hollow, or non-hollow, or the light integrator may be formed of a pair of fly's eye lenses.

As the illuminating device of these configurations, the light source may use a solid light-emitting element.

Such the illuminating device may be structured in such a manner as to constantly emit a light in red, a light in green, and a light in blue when the illuminating device is turned on (Hereinafter, referred to as a first configuration in this section). Or, such the illuminating device may be structured in such a manner as to sequentially emit the light in red, the light in green, and the light in blue for a predetermined time period when the illuminating device is turned on (Hereinafter, referred to as a second configuration in this section).

A projection type video display of the present invention comprises an illuminating device according to the first configuration, one full color light valve, and a projecting means for projecting image lights obtained as a result of being passed through the full color light valve.

Furthermore, a projection type video display of the present invention comprises an illuminating device according to the second configuration, one light valve, and a means for supplying video signals for each color to the light valve in synchronous with emitting timings of respective colors, and a projecting means for projecting images lights obtained as a result of being passed through the light valve.

In addition, in any one of the illuminating devicees described above, members such as a circuit board, a storing apparatus, an external-equipment attaching portion, and others, may be arranged in the vicinity of the light source in red. Furthermore, in any one of the projection type video displays described above, members such as a circuit board, a storing apparatus, an external-parts attaching portion, and others, may be arranged in the vicinity of the light source in red.

Furthermore, in any one of the illuminating devicees described above, it may be possible to be structured of being driven by a primary battery or a secondary battery. In addition, in any one of the projection type video displays described above, it may be possible to be structured of being driven by a primary battery or a secondary battery.

In addition, an illuminating device of the present invention is an illuminating device provided with a cross dichroic mirror that splits a light from a light source in white into a plurality of lights in respective colors, and comprises any one of the cross dichroic mirrors described above as the cross dichroic mirror (Hereinafter, referred to as a third configuration). In the illuminating device of the third configuration, the light source may be formed of a solid light-emitting element. In addition, the projection type video display of the present invention comprises an illuminating device of the third configuration or the illuminating device according thereto, a plurality of light valves for lights in respective colors, and a projecting means for projecting and combining image lights obtained as a result of being passed through the light valves.

Furthermore, an illuminating device of the present invention comprises: a first light source that emits a light in red, a second light source that emits a light in green, a third light source that emits a light in blue; a cross dichroic mirror that has two light incidence areas to be faced to each other, an alternate one light incidence area, and one light exit area facing the alternate one light incidence area and guides the light in red, the light in green, and the light in blue to be incident toward the approximate same direction, and emits lights in respective colors from the light exit area; and a light integrator for rendering uniform on an object to be illuminated an intensity of lights in respective colors emitted from the cross dichroic mirror.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
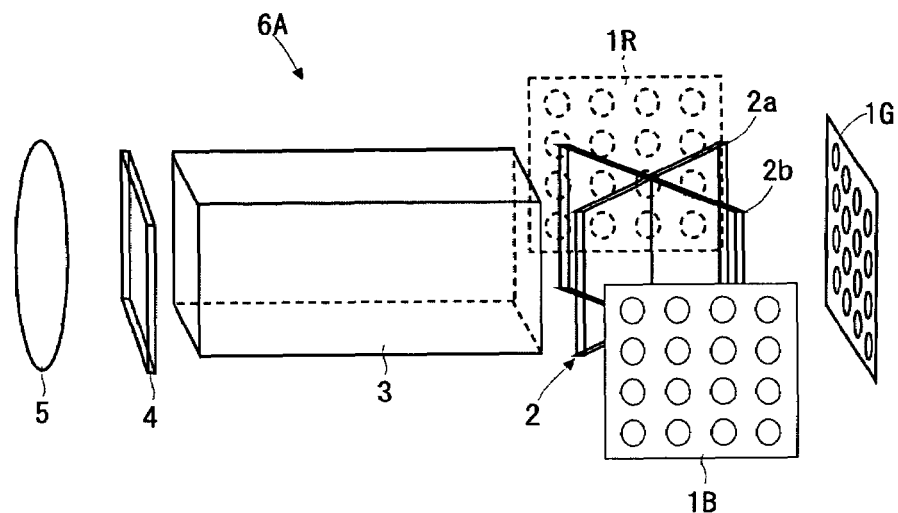
FIG. 1 is a descriptive diagram showing an optical system of a projection type video display of an embodiment of the present invention.

Hereinafter, an embodiment of the present invention will be described based on FIG. 1 to FIG. 7. FIG. 1 is a view showing an optical system of a single-plate projection type video display 6A. The projection type video display 6A is provided with three LED light sources 1R, 1G, and 1B (Hereinafter, a numeral "1" is used when not specifying each LED light source). Each LED light source 1 has structure in which LEDs (light-emitting diodes) are arranged in an array shape. A horizontal to vertical ratio of each LED light source 1 may approximately be equal to the horizontal to vertical ratio of a liquid crystal panel 4. The LED light source 1R emits a light in red, the LED light source 1G emits a light in green, and the LED light source 1B emits a light in blue. The LED light source 1G is provided to be faced with a light incidence surface of a rod integrator 3, and a cross dichroic mirror 2 is sandwiched therebetween. The LED light source 1R and the LED light source 1B are provided to be faced to each other, and the cross dichroic mirror 2 is sandwiched. That is, in a first light incidence area of the cross dichroic mirror 2, the LED light source 1R is provided, in a second light incidence area, the LED light source 1B is provided, and in a third light incidence area, the LED light source 1G is arranged. It is noted that although not shown, it may be possible to increase a utilization efficiency of the emitted light from the LED by providing a mirror plate in a non-light incidence area of the cross dichroic mirror 2.

Figure 2:
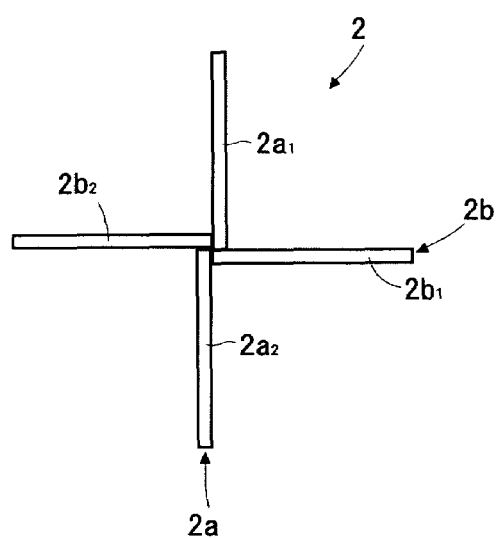
FIG. 2 is a side surface view showing a cross dichroic mirror.

The cross dichroic mirror 2, as shown in FIG. 2, is formed of being in a cross arrangement in which a first cross dichroic mirror portion 2a and a second cross dichroic mirror portion 2b are perpendicular. The first cross dichroic mirror portion 2a reflects the light in red, and transmits lights other than in red. The second cross dichroic mirror portion 2b reflects the light in blue, and transmits lights other than in blue. The first cross dichroic mirror portion 2a is formed of a first divided portion $2a_1$ and a second divided portion $2a_2$, and the second cross dichroic mirror portion 2b is formed of a first divided portion $2b_1$ and a second divided potion $2b_2$. Angles of the respective divided portions are 90 degrees. The cross dichroic mirror 2 has structure of the cross arrangement in which these four divided portions bring respective corner sides into close contact. As a result of having such the structure, a problem (a bordering line (a dark line, a vertical streak) is inserted in a projected video, and others) likely to occur in a conventional cross dichroic mirror is solved.

A surface connecting an edge of each of one end sides (one end side in a light incidence side) of two pieces of dichroic mirrors 2a, 2b in the cross dichroic mirror 2 is defined as a light incidence area in the cross dichroic mirror 2. The first and second light incidence areas (a light-in-red incidence area and a light-in-blue incidence area) of the cross dichroic mirror 2 are formed in parallel to each other. Furthermore, a side surface of the rod integrator 3 is formed to be flush with the light incidence area. In addition, two non-light incidence areas (an area in which the above-described mirror plate is arranged) to be faced to each other of the cross dichroic mirror 2, too, are formed in parallel to each other, and the side surface of the rod integrator 3 is formed in parallel or approximately in parallel with the non-light incidence area. Furthermore, the side surface of the rod integrator 3 is formed to be flush with the non-light incidence area. Primary ray axes in the LED light source 1R and the LED light source 1B are perpendicular to the first and second light incidence areas. In addition, the primary ray axes in the LED light source 1R and the LED light source 1B intersect at an angle of 45 degrees toward the first cross dichroic mirror portion 2a and the second cross dichroic mirror portion 2b.

A light in color emitted from each LED light source 1 is guided into the light incidence area of the rod integrator 3 by the cross dichroic mirror 2. The rod integrator 3 has rectangular tube structure (hollow structure) of which inner surface is a mirror surface. The horizontal to vertical ratio of at least the light exit area of the rod integrator 3 is approximately equal to the horizontal to vertical ratio of the liquid crystal panel 4. The rod integrator 3 reflects the lights in respective colors from each LED light source 1 on the mirror surface, and guides the lights onto the liquid crystal panel 4 so that a light intensity distribution of the lights in respective colors are rendered approximately uniform on the liquid crystal panel 4 (object to be illuminated).

The liquid crystal panel 4 has structure having an RGB color filter, or has structure not having the RGB color filter. In a case of using the liquid crystal panel 4 structured of having the RGB color filter, all the LED light sources 1R, 1G, and 1B are simultaneously turned on, and a light in white is guided onto the liquid crystal panel 4. In a case of using the liquid crystal panel 4 structured of not having the RGB color filter, in addition to sequentially turning on the LED light sources 1R, 1G, and 1B in a time-sharing manner for a predetermined time period, a video signal of the respective colors are supplied to the liquid crystal panel 4 in synchronous with a timing of turning on for the predetermined time period.

The light (image light) modulated as a result of passing through the liquid crystal panel 4 is enlarged and projected by a projection lens 5, and projected and displayed on a screen not shown.

The LED light source 1 may be provided with a lens for rendering the light parallel. In addition, the LED light source 1 may use a light source formed of having LED chips arranged in an array shape, and a lens cell (for bringing into the parallel light, for example) arranged on a light exit side of each LED chip by a mold, and others. Instead of the LED light source 1, a light source formed of one LED may be used.

A polarization conversion system may be provided on the light exit side of the rod integrator 3. The polarization conversion system in this case may be provided with a single PBS (polarizing beam splitter) corresponding to a size of a light exit portion of the rod integrator 3, a mirror provided in parallel with a polarized light separating surface in the PBS, and a retardation plate provided in the mirror or the light exit side of the PBS. However, in this case, the size of a light exit portion of the polarization conversion system is two times larger than that of the light exit portion of the rod integrator 3. Therefore, an entire shape of the light exit portion of the polarization conversion system is preferably rendered approximately equal to the horizontal to vertical ratio of the liquid crystal panel. In this case, provided that the horizontal to vertical ratio of the liquid crystal panel is A:B, the horizontal to vertical ratio of the light exit portion of the rod integrator 3 is A:B/2, for example. Furthermore, it may be possible that not only the horizontal to vertical ratio of the light exit portion of the rod integrator 3 but also the horizontal to vertical ratio of the light incidence portion is rendered A:B/2. In this case, by providing an anamorphic optical system between the cross dichroic mirror 2 and the light incidence portion of the rod integrator 3, the horizontal and vertical ratio of a light flux may be adjusted.

Furthermore, the polarization conversion system may be provided on the light exit side of each LED. The polarization conversion system in this case may be provided with the single PBS corresponding to a size of the light exit portion of the LED, the mirror provided in parallel with the polarized light separating surface in the PBS, and the retardation plate provided in the mirror or on the light exit side of the PBS.

The polarization conversion system may not be limited to an apparatus formed of the single PBS, and the two PBSs may be used toward one LED. In this case, the polarized light separating surface in the two PBSs is provided in a "<" shape (a shape that looks like "<", seen from the side), and the LED is arranged on a tip end side of the "<" shape. In addition, it may be also possible to use the two PBSs toward a plurality of LEDs aligned in one line. In this case, the plurality of LEDs aligned in one line are arranged on the tip end side in the "<" shape. Furthermore, it is possible to use a dielectric multi-layered film or a wire grid as the polarized light separating surface.

Figure 3:
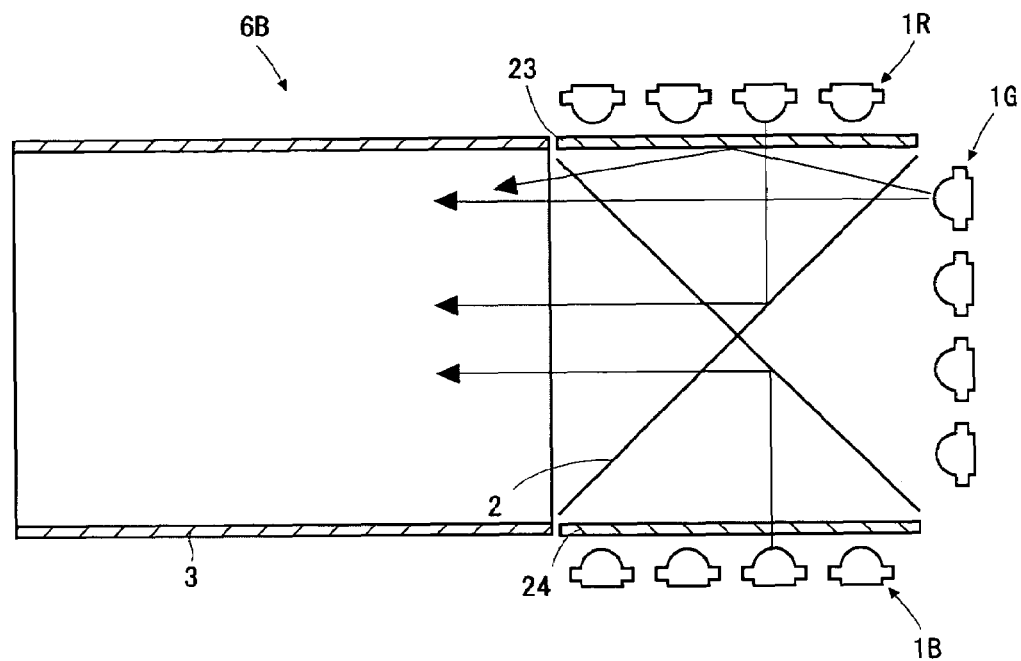
FIG. 3 is a descriptive diagram showing an optical system of a projection type video display (illuminating device) of another embodiment of the present invention.

An illuminating device of the projection type video display 6B is shown in FIG. 3. In the illuminating device, in the first light incidence area (an area opposite to the LED light source 1R) of the cross dichroic mirror 2, a dichroic mirror 23 is provided, and in the second light incidence area (an area opposite to the LED light source 1B) of the cross dichroic mirror 2, a dichroic mirror 24 is provided. The dichroic mirror 23 transmits the light in red, and reflects lights other than in red. In addition, the dichroic mirror 24 transmits the light in blue, and reflects lights other than in blue. Such the structure enables to increase a utilization efficiency of the light in green emitted from the LED light source 1G Furthermore, the dichroic mirrors 23, 24 have a function of the rod integrator, and thus, increasing consistency of an illumination light.

Figure 4:
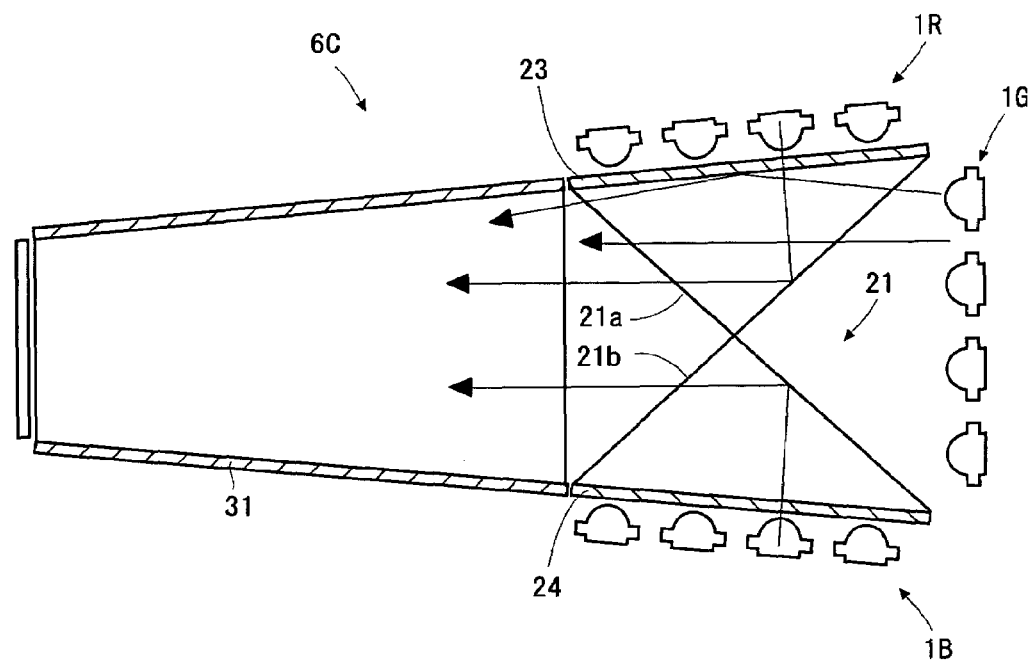
FIG. 4 is a descriptive diagram showing an optical system of a projection type video display (illuminating device) of another embodiment of the present invention.

The projection type video display 6C shown in FIG. 4 is provided with a cross dichroic mirror 21 and a rod integrator 31. The cross dichroic mirror 21 has the first and second light incidence areas to be faced to each other formed not in parallel, forming a tapered shape. Furthermore, the two dichroic mirrors 23, 24 are arranged not in parallel with each other corresponding to the first and second light incidence areas not in parallel. Two non-light incidence areas (an area in which the above-described mirror plate is arranged), which are faced to each other, of the cross dichroic mirror 21, too, are formed not in parallel with each other. Only one pair of the first and second light incidence areas to be faced to each other, and the two non-light incidence areas to be faced to each other may be rendered not parallel.

Two opposite sides of the rod integrator 31 are formed in parallel or approximately in parallel with the first and second light incidence areas of the cross dichroic mirror 21, forming the tapered shape. Furthermore, the two opposite sides of the rod integrator 31 are formed to be flush with the first and second light incidence areas. The other two opposite sides of the rod integrator 31 are formed in parallel or approximately in parallel with the non-light incidence areas of the cross dichroic mirror 21. Furthermore, the two opposite sides of the rod integrator 31 are formed to be flush with the non-light incidence areas. The light exit area of the rod integrator 31 is smaller than the light incidence area thereof.

The light exit area of the cross dichroic mirror 21 is smaller than the third light incidence area. In such the configuration, a presence of the dichroic mirrors 23, 24 becomes more effective. The cross dichroic mirror having the light exit area larger than the third light incidence area, and the rod integrator having the light exit area larger than the light incidence area may be adopted, and in such the structure, it is possible to render small a distribution angle of the light. In this case, too, the two dichroic mirrors 23, 24 are arranged not in parallel with each other, corresponding to the first and second light incidence areas not in parallel.

In an example of structure shown in FIG. 4, a first cross dichroic mirror portion 21a and a second cross dichroic mirror portion 21b in the cross dichroic mirror 21 intersect at a non-right angle. The primary ray axes of the LED light source 1R and the LED light source 1B are adjusted in such a manner that the primary ray axes of the light source reflected on the cross dichroic mirror portions 21a, 21b are rendered parallel to each other. Needless to say, the first cross dichroic mirror portion 21a and the second cross dichroic mirror portion 21b may intersect at a right angle. In this case, the primary ray axes in the LED light source 1R and the LED light source 1B intersect at an angle of 45 degrees toward each cross dichroic mirror portion.

Figure 5:
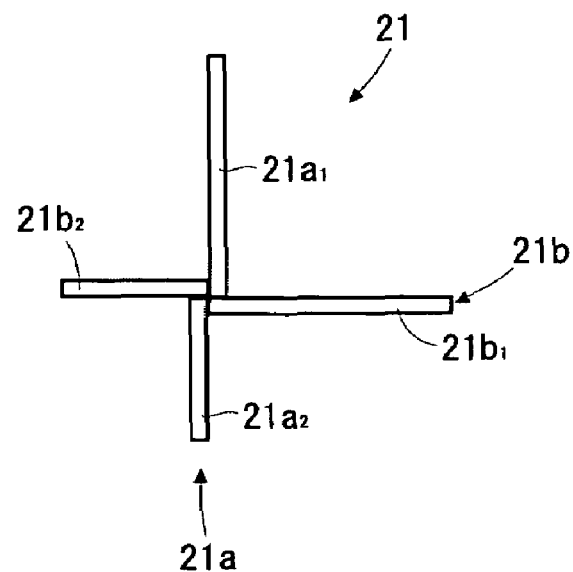
FIG. 5 is a side surface view showing a cross dichroic mirror, which intersects at a right angle, used in the projection type video display in FIG. 4.

FIG. 5 shows a perpendicularly intersecting cross dichroic mirror 21. The first cross dichroic mirror portion 21a is formed of a first divided portion $21a_1$ and a second divided portion $21a_2$, and the second cross dichroic mirror portion 21b is formed of a first divided portion $21b_1$ and a second divided portion $21b_2$. The first divided portion $21a_1$ is larger than the second divided portion $21a_2$. In addition, the first divided portion $21b_1$ is larger than the second divided portion $21b_2$. That is, the cross point in the cross dichroic mirror 21 exists in a non-center potion of the first dichroic mirror portion 21a and the second dichroic mirror portion 21b. These four pieces of the divided portions have corner sides of 90 degrees. The cross dichroic mirror 21 has structure of the cross arrangement in which these four pieces of the divided portions bring respective corner sides into close contact.

Figure 6:
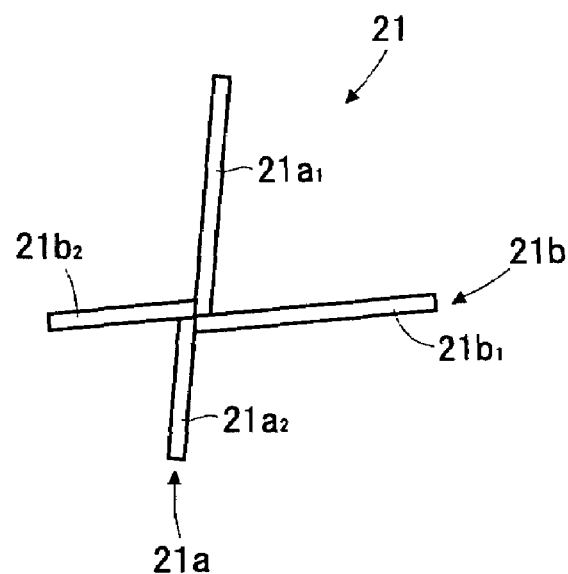
FIG. 6 is a side surface view showing a cross dichroic mirror, which intersects at a non-right angle, used in the projection type video display in FIG. 4.

FIG. 6 shows a non-perpendicularly intersecting cross dichroic mirror 21. The first cross dichroic mirror portion 21a is formed of the first divided portion $21a_1$ and the second divided portion $21a_2$, and the second cross dichroic mirror portion 21b is formed of the first divided portion $21b_1$ and the second divided portion $21b_2$. The first divided portion $21a_1$ is larger than the second divided portion $21a_2$. In addition, the first divided portion $21b_1$ is larger than the second divided portion $21b_2$. That is, the cross point in the cross dichroic mirror 21 exists in a non-center potion of the first dichroic mirror portion 21a and the second dichroic mirror portion 21b. These four pieces of the divided portions have corner sides of a non-right angle of 90 degrees. The cross dichroic mirror 21 has structure of the cross arrangement in which these four pieces of the divided portions bring respective corner sides, which are at the non-right angle, into close contact.

Figure 7:
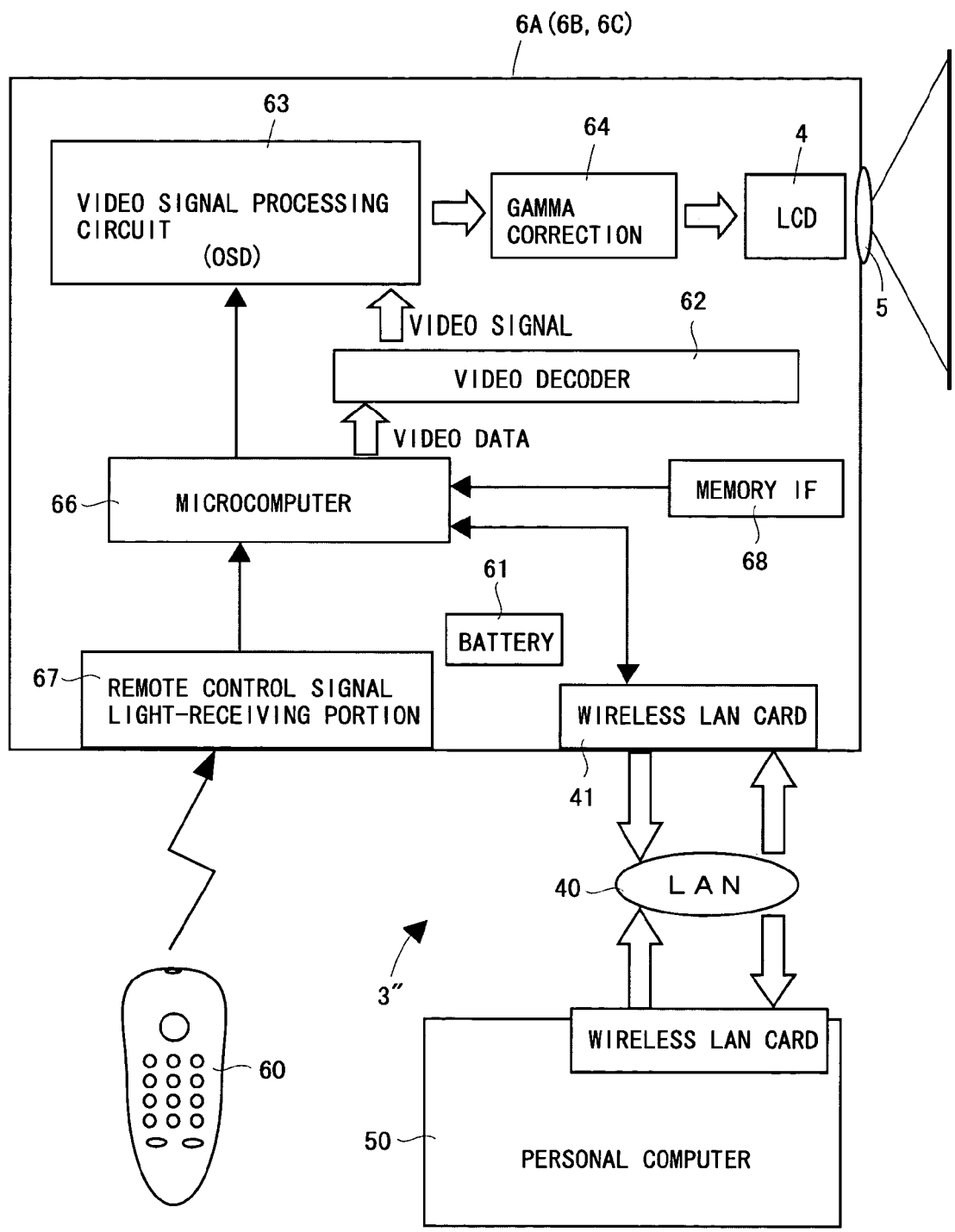
FIG. 7 is a descriptive diagram showing a signal processing system, and others, of a projection type video display of an embodiment of the present invention.

FIG. 7 is a descriptive diagram showing one example of a signal processing system of the projection type video displays 6A, 6B, and 6C. The projection type video displays 6A, 6B, and 6C are provided with a video signal processing circuit 63, a gamma correction circuit 64, a liquid crystal panel 4, and others, and modulate by the liquid crystal panel 4 the light emitted from the LED light source 1 and project the light. A battery (a primary battery or a secondary battery) 61 supplies a power to each circuit. A microcomputer 66 of the projection type video display 6 supplies to a video decoder 62 image data (encoded data) received from a personal computer 50 via a wireless LAN card 41, and image data (encoded data) read out from a memory card by a memory interface 68.

The video decoder 62 demodulates the encoded data so as to generate the video signal, and supplies the video signal to the video signal processing circuit 63 that contains an OSD (on-screen display). The microcomputer 66, in a case of receiving text data via the wireless LAN card 4, and other cases, is also capable of controlling the video signal processing circuit 63 in such as manner that the text is OSD-displayed. In addition, in the projection type video displays 6A, 6B, and 6C, a remote control signal light-receiving portion 67 is provided, and it is possible to operate the projection type video displays 6A, 6B, and 6C by a remote control transmitter 60.

A loading portion of the wireless LAN card 41, a loading portion of the memory cared 68, or another circuit board, and others are arranged in the vicinity of the LED light source 1R. Each LED light source 1 generates heat upon emitting the light so that it is preferable that the LED light source is structured of being on a ventilator plate. In a case of being in view of such light source cooling, an arranging space of the circuit board, and others become narrow if the ventilator plate becomes large, for example, and the arranging space of the circuit board, and others become large if the ventilator plate is rendered small. Herein, the LED light source 1R is a light source having a lower heating amount compared to the other LED light sources. In this embodiment, the loading portion of the wireless LAN card 41, the loading portion of the memory card 68, or another circuit board, and others are arranged in the vicinity of the LED light source 1R, and this arrangement, even if the ventilator plate for the LED light source 1R becomes small, allows to render small an influence toward the light source cooling. In other words, the projection type video displays 6A, 6B, and 6C are reduced in size and weight so that it is possible to arrange the circuit board, and others closer to the optical system, and render small the influence toward the cooling of the circuit board, and etc. Needless to say, such the structure (the structure in which the circuit board, the storing device, the members such as the external-equipment attaching portion, and others are arranged in the vicinity of the light source in red, the structure driven by the primary battery or the secondary battery) is adaptable to the structure as the illuminating device, and furthermore, is adaptable to the structure using an ordinary cross dichroic mirror and a cross dichroic prism instead of the cross dichroic mirrors 2, 21.

In the above descriptions, the projection type video displays 6A, 6B, and 6C use a transmission type liquid crystal panel, and however, are not limited thereto. In addition, a reflection type liquid crystal panel may be used, and instead of these liquid crystal panels, a type of the display panel that drives a micro mirror, which is a pixel, one by one, may be used. Furthermore, the solid light-emitting element is not limited to the light-emitting diode (LED), and an organic or inorganic electroluminescence, and others may be used.

Furthermore, in the above-described illuminating device, it is possible, too, to use a glass rod integrator having non-hollow structure as the light integrator. In addition, integrator lens formed of one pair of fly's eye lenses may be used as the light integrator. In a case of obtaining sufficient consistency in the light flux emitted from the light source, the light integrator may be omitted. Furthermore, the light source is not limited to the solid light-emitting element. Moreover, it may be possible to be provided with a projection-use curved mirror instead of the projection lens.

Furthermore, it may be possible to use the cross dichroic mirrors 2, 21 so as to split the light in white from the light source in white (not limited to the solid light-emitting element) into the lights in respective colors. In a case of using such the illuminating device, the projection type video display may be provided with a plurality of light valves for the lights in respective colors, the cross dichroic prism (or the cross dichroic mirror) for composing the image lights obtained as a result of being via the light valves, and the projection lens (or the curved surface mirror for projection) for projecting the image lights via the cross dichroic prism (or the cross dichroic mirror). It is possible, too, to use the cross dichroic mirrors 2, 21 as the cross dichroic mirror for combining the image lights.

According to the present invention, it is easy to reduce the illuminating device and the projection type video display in size and weight. Furthermore, the present invention exhibits various effects such as reducing the vertical streak in the projected video, and others.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cross dichroic mirror, having structure formed of a first dichroic mirror divided into two portions A and B and a second dichroic mirror divided into two portions C and D, and formed of a cross arrangement in which these four portions A, B, C and D bring respective corner sides into close contact, wherein one surface of the portion A of the first dichroic mirror and one surface of the portion B of the first dichroic mirror are in the same plane without gapping and one surface of the portion C of the second dichroic mirror and one surface of the portion D of the second dichroic mirror are in the same plane without gapping and wherein the one surface of the portion A of the first dichroic mirror contacts a side surface of the portion C of the second dichroic mirror, the one surface of the portion C of the second dichroic mirror contacts a side surface of the portion B of the first dichroic mirror, the one surface of the portion B of the first dichroic mirror contacts a side surface of the portion D of the second dichroic mirror, and the one surface of the portion D of the second dichroic mirror contacts a side surface of the portion A of the first dichroic mirror, wherein each of the portions is supported by the two surfaces of the portions located on both sides of each of the portions.

2. A cross dichroic mirror according to claim 1, wherein a cross point exists in a non-center portion of the first dichroic mirror and the second dichroic mirror.

3. A cross dichroic mirror according to claim 1, wherein said first dichroic mirror and the second dichroic mirror are in the cross arrangement at a right angle.

4. A cross dichroic mirror according to claim 1, wherein said first dichroic mirror and said second dichroic mirror are in the cross arrangement in a non-right angle.

5. An illuminating device provided with a cross dichroic mirror that splits a light from a light source in white into a plurality of lights in respective colors, comprising the cross dichroic mirror according to any one of claims 1 to 4 as said cross dichroic mirror.

6. An illuminating device according to claim 5, wherein said light source is formed of a solid light-emitting element selected from a light-emitting diode (LED), an organic electroluminescence element or an inorganic electroluminescence element.

7. A projection type video display, comprising the illuminating device according to claim 5, a plurality of light valves for lights in respective colors, a projecting means for projecting, by composing, image lights obtained as a result of being passed through said light valves.

8. An illuminating device, comprising:
the cross dichroic mirror according to claim 1 as an optical member having first and second light incidence areas to be faced to each other, one light exit area, and a third light incidence area facing said light exit area, guiding each light in respective colors incident from each light incidence area into the approximate same direction, and emitting from said light exit area, and comprising:
a light source in red arranged in said first light incidence area;
a light source in blue arranged in said second light incidence area; and
a light source in green arranged in said third light incidence area.

9. An illuminating device according to claim 8, comprising a light integrator that renders uniform on an object to be illuminated an intensity of each light emitted from said dichroic mirror.

10. An illuminating device according to claim 9, wherein said light integrator is a rod integrator structured of being hollow, or non-hollow.

11. An illuminating device according to claim 9, wherein said light integrator is formed of a pair of fly-eye lens.

12. An illuminating device according to claim 8, wherein said light source is formed of a solid light-emitting element selected from a light-emitting diode (LED), an organic electroluminescence element or an inorganic electroluminescence element.

13. An illuminating device according to claim 8, structured of constantly emitting a light in red, a light in green, and a light in blue when the illuminating device is turned on.

14. A projection type video display, comprising the illuminating device according to claim 13, one full color light valve, and a projecting means for projecting image lights obtained as a result of being passed through said full color light valve.

15. An illuminating device according to claim 8, structured of sequentially emitting a light in red, a light in green, and a light in blue for a predetermined time period when the illuminating device is turned on.

16. A projection type video display, comprising the illuminating device according to claim 15, one light valve, and a means for supplying video signals for each color to said light valve in synchronous with emitting timings of respective colors, and a projecting means for projecting image lights obtained as a result of being passed through said full color light valve.

17. A projection type video display according to claim 14 or 16, characterized in that a circuit board, a storing apparatus, members such as an external-equipment attaching portion, and others, are arranged in the vicinity of said light source in red.

18. A projection type video display according to claim 14 or 16, characterized in being driven by a primary battery, and a secondary battery.

19. An illuminating device according to claim 8, characterized in that a circuit board, a storing apparatus, members such as an external-equipment attaching portion, and others, are arranged in the vicinity of said light source in red.

20. An illuminating device according to claim 8, characterized in being driven by a primary battery or a secondary battery.

21. An illuminating device, comprising:
a first light source that emits a light in red;
a second light source that emits a light in green;
a third light source that emits a light in blue;
a cross dichroic mirror having two light incidence areas to be faced to each other, an alternate one light incidence area, and one light exit area facing said alternate one light incidence area, guiding said light in red, said light in green, and said light in blue to be incident toward the approximate same direction, and emitting lights in respective colors from said light exit area; and
a light integrator for rendering uniform on an object to be illuminated an intensity of lights in respective colors emitted from said cross dichroic mirror.

* * * * *